(12) United States Patent
Mol et al.

(10) Patent No.: US 7,187,744 B2
(45) Date of Patent: Mar. 6, 2007

(54) METHOD OF PROVIDING A NUCLEAR FUEL AND A FUEL ELEMENT PROVIDED BY SUCH A METHOD

(75) Inventors: Charles Adelbert Mol, Almelo (NL); Klaas Bakker, Alkmaar (NL)

(73) Assignee: Urenco Nederland B.V., Almel (NL)

( * ) Notice: Subject to any disclaimer, the term of this patent is extended or adjusted under 35 U.S.C. 154(b) by 0 days.

(21) Appl. No.: 10/383,861

(22) Filed: Mar. 10, 2003

(65) Prior Publication Data
US 2003/0223530 A1 Dec. 4, 2003

(30) Foreign Application Priority Data
Mar. 11, 2002 (EP) ................... 02075937

(51) Int. Cl.
G21C 3/00 (2006.01)
(52) U.S. Cl. ............. 376/409; 376/422; 376/261; 420/429; 420/3
(58) Field of Classification Search ............ 376/422, 376/409, 261, 186; 420/1, 429, 3
See application file for complete search history.

(56) References Cited

U.S. PATENT DOCUMENTS

| | | | |
|---|---|---|---|
| 2,772,964 A * | 12/1956 | Thomas et al. | 420/422 |
| 2,926,113 A * | 2/1960 | McGeary et al. | 148/401 |
| 3,306,733 A * | 2/1967 | Virot et al. | 420/3 |
| 3,343,847 A | 9/1967 | Fizzotti et al. | |
| 3,343,947 A * | 9/1967 | Fizzotti et al. | 420/3 |
| 3,790,440 A * | 2/1974 | Keshishian | 252/644 |
| 3,979,498 A * | 9/1976 | Campbell | 423/2 |
| 4,064,025 A * | 12/1977 | Chen | 204/157.22 |
| 4,162,231 A | 7/1979 | Horwitz et al. | 423/2 |
| 4,193,855 A * | 3/1980 | Tuccio | 204/157.2 |
| 4,381,286 A * | 4/1983 | Floreancig | 423/9 |
| 4,389,292 A * | 6/1983 | Phillips et al. | 204/157.2 |
| 4,447,303 A * | 5/1984 | Jensen et al. | 204/157.2 |
| 4,568,436 A * | 2/1986 | Feichtner et al. | 204/157.22 |
| 4,584,184 A * | 4/1986 | Nalewajek et al. | 423/15 |
| 4,690,742 A * | 9/1987 | Cantrell et al. | 204/157.2 |
| 4,705,577 A * | 11/1987 | Ondracek | 419/8 |
| 4,963,317 A | 10/1990 | Wiencek et al. | 376/422 |
| 5,082,603 A * | 1/1992 | Horie et al. | 588/15 |
| 5,250,231 A * | 10/1993 | Grossman et al. | 252/636 |
| 5,393,322 A * | 2/1995 | Ugo | 75/344 |
| 5,978,432 A * | 11/1999 | Kim et al. | 376/261 |
| 6,140,522 A * | 10/2000 | Mol et al. | 556/129 |
| 2002/0149125 A1 * | 10/2002 | Gradel et al. | 264/0.5 |

FOREIGN PATENT DOCUMENTS

| | | | |
|---|---|---|---|
| EP | 001345239 A1 * | 9/2003 | |
| GB | 766061 | 1/1957 | |
| GB | 1186004 | * 4/1970 | |

OTHER PUBLICATIONS

Kauffman et al., "Nuclear Reactor Fuel Elements", 1962, Interscience Publishers; pp. 70-71; 232-233.*
Bakker et al., "Using Molybdenum Depleted in 95-Mo in UMo Fuel", Nov. 2002, 2002 International Meeting on Reduced enrichment for Research and Test Reactors.*
M. M. Bretscher, Neutronic Performance of High-Density Leu Fuels in Water-Moderated and Water-Reflected Research Reactors, Jul. 1996, last accessed Sep. 7, 2005, available @ http://www.rertr.anl.gov/ADVFUELS/MBHD.PDF.*
G. L. Hofman, A Short Note on High Density Dispersion Fuel, Jun. 1996, last accessed Sep. 7, 2005, available @ http://www.rertr.anl.gov/ADVFUELS/GHHD.PDF.*
JP. Durand, Abstract Only, Preliminary Developments of MTR Plates with UMo Fuel, Oct. 1997, last accessed Sep. 7, 2005, available @ http://www.rertr.anl.gov/Fuels97/Durand97.html.*
JP. Durand, Leu Fuel Development at Cerca Status as of Oct. 1998, last accessed Sep. 7, 2005, available @ http://www.rertr.anl.gov/Fuels98/JDurand.pdf.*
Uranium Production, Last updated Jun. 24, 2000, last accessed Sep. 7, 2005, available @ http://www.fas.org/nuke/intro/nuke/uranium.htm.*
Definition of "deplete", p. 309 of Merriam Webster's Collegiate Dictionary tenth edition, copyright 2001.*
Laucht et al., A New Standard for Uranium Metal Intended for Research Reactor Fuel Fabrication, ,Oct. 1998, last accessed Sep. 7, 2005, available @ http://www.rertr.anl.gov.*
McLain et al. Reactor Handbook Second Edition, vol. IV Engineering, Copyright 1964 by John Wiley and Sons, Inc.*

* cited by examiner

*Primary Examiner*—Jack Keith
*Assistant Examiner*—Daniel Lawson Greene, Jr.
(74) *Attorney, Agent, or Firm*—Pillsbury Winthrop Shaw Pittman LLP

(57) ABSTRACT

A method for providing a nuclear fuel includes forming a uranium-molybdenum alloy that provides an enhanced reactivity in research, test and radioisotope production nuclear reactors. In this uranium-molybdenum alloy, the uranium is enriched in the isotope 235-U, while the molybdenum is depleted in the isotope 95-Mo. The thus obtained enhanced reactivity can have at least two advantages, depending on the exact use of the fuel element: a requirement for less uranium in the fuel and the use of the fuel elements during a longer period in the reactor.

21 Claims, No Drawings

METHOD OF PROVIDING A NUCLEAR FUEL AND A FUEL ELEMENT PROVIDED BY SUCH A METHOD

BACKGROUND OF THE INVENTION

1. Field of the Invention

This invention relates to a method for providing a nuclear fuel and a fuel element provided with a nuclear fuel made by such a method.

2. Description of the Related Art

It is known to produce nuclear fuels containing relatively low densities of highly enriched uranium. Highly enriched uranium (HEU) has the disadvantage that for political reasons, the use of this material is undesirable, because it can not only be deployed for peaceful purposes but can also be used for less peaceful applications, as for perpetrating terrorist attacks and/or manufacturing atomic bombs. For this reason in recent years the use of low enriched uranium (LEU), which has a 235-U content of less than 20%, is strongly encouraged. In view of the above-mentioned disadvantage of HEU, a nuclear fuel preferably comprises uranium not highly enriched in the 235-U isotope. A disadvantage of such a fuel, however, is that the total uranium content (the sum of all isotopes) in an LEU-containing fuel element must be much higher than that in an HEU-containing fuel element, in order to obtain a similar reactivity. However, metallic uranium inherently has insufficient mechanical stability during irradiation to be used in elemental form.

It is known to impart stability to the uranium by using it in a chemical composition with silicon, e.g. $U_3Si_2$. In this composition, however, the density of the uranium still cannot always attain the desired higher value to be able to provide a reactivity sufficiently high to enhance the utility or the economics of the reactor. For this reason a new class of nuclear fuels for use in research, test and radioisotope-production reactors is being developed based on uranium-molybdenum alloys. The high uranium density of these alloys should make it possible to fuel these reactors using LEU instead of HEU, without causing a large decrease of the neutron flux in these reactors. These uranium-molybdenum alloys offer the further advantage of being able to be reprocessed in currently operating reprocessing plants.

Uranium-molybdenum alloys are currently being tested as dispersions of alloy fuel particles in a non-fissionable matrix material, such as aluminum, and as a monolithic fuel. Both types of fuel are enclosed in a cladding such as aluminum. U.S. Pat. No. 5,978,432 describes one method of producing a dispersion fuel using uranium-molybdenum alloys. The most common design of a Material Test Reactor (MTR) fuel element using U—Mo fuel and U—Mo fuel plates is as follows. U—Mo particles are dispersed into an aluminum matrix. The dispersed particles and the aluminum matrix make up a thin fuel layer, which is placed between two thin cladding plates of aluminum alloy. Such a cladding is, for example, described in the U.S. Pat. No. 4,963,317. In the present invention, the aluminum matrix is to be understood to comprise the aluminum of the fuel only. Therefore, the bulk of the aluminum cladding does not form part of the matrix in the present invention.

The thus-obtained fuel plates, each comprising a fuel layer enclosed by cladding plates, are either curved or flat. Approximately 20 of such plates form a fuel element together with structural components. Cooling water that flows between the plates cools the fuel plates fuelling a reactor during the operation thereof.

Although the use of uranium-molybdenum alloys makes it possible to increase the uranium density in the nuclear fuel for research and test reactors, the use of molybdenum carries the penalty of a significant neutron absorption, which decreases the effect of the added uranium, resulting in a relatively low reactivity. Therefore, the application of molybdenum in a nuclear fuel has been unfavourable albeit its advantages.

SUMMARY OF THE INVENTION

It is an aspect of the present invention to overcome the problems described above of providing a nuclear fuel that comprises an uranium-molybdenum alloy, in particular it is an aspect of the present invention to increase the reactivity of such a fuel.

To that end, the present invention provides a nuclear fuel including an alloy of metallic uranium and molybdenum, the uranium being enriched in the isotope 235-U, while the molybdenum is depleted in the isotope 95-Mo.

The present invention is based on Applicant's discovery that the use of molybdenum depleted in 95-Mo, which absorbs less neutrons compared to natural molybdenum, results in a higher reactivity of the nuclear fuel. This effect is explained below. The higher reactivity can be used to render a number of advantages, depending among others on the specific design of the fuel element to be used and the manner in which the fuel element is used. Possible advantages of using molybdenum depleted in 95-Mo are: high reactivity; increased flux; achieving a higher concentration of molybdenum in the fuel in case of 95-Mo-depleted molybdenum, while retaining identical flux, which may render an increasingly stable fuel; identical flux, but with a longer cycle, which allows for consumption of a smaller quantity of fuel elements; and/or smaller quantity of expensive enriched uranium per fuel element to retain identical flux.

DETAILED DESCRIPTION

The reasons for the effect of the use of molybdenum depleted in 95-Mo instead of natural molybdenum, are shown in Table 1 below, which includes the thermal neutron absorption cross section (D) and the resonance integral of various molybdenum isotopes. The thermal neutron absorption cross section and the resonance integral are measures for the amount of thermal neutrons and epi-thermal neutrons absorbed by the molybdenum respectively. The thermal neutron cross section data in Table 1 originate from the 81st edition of the Handbook of Chemistry and Physics (2000–2001), CRC Press, Robert C. Weast et al, page 11–165/166. The resonance integral data are a typical example of the results of neutronics computations.

| Molybdenum isotope | Abundant atomic % | D (barns) | Resonance Integral (barns) |
|---|---|---|---|
| 92-Mo | 14.84 | 0.06 | 0.8 |
| 94-Mo | 9.25 | 0.02 | 0.8 |
| 95-Mo | 15.92 | 13.4 | 109 |
| 96-Mo | 16.68 | 1.5 | 17 |
| 97-Mo | 9.55 | 2.2 | 14 |
| 98-Mo | 24.13 | 0.14 | 7.2 |
| 100-Mo | 9.63 | 0.19 | 3.6 |
| Natural Mo | — | 2.7 | 23.8 |

Table 1. Effective cross section of molybdenum isotopes for neutrons. The values for natural Mo have been computed using the weighed averages of the data for the isotopes.

Table 1 shows that 95-Mo has both the highest thermal neutron absorption cross section (D) and the highest resonance integral. Therefore the presence of the considerable fraction 95-Mo in natural molybdenum (about 16%) has a significant negative impact on the reactivity of U—Mo fuel containing natural Mo. Comparing the computed D-value and the computed resonance integral for natural molybdenum with those for the isotopes 92-Mo, 94-Mo, 96-Mo, 97-Mo, 98-Mo and 100-Mo shows that all these isotopes have a lower computed D-value and a lower computed resonance integral compared to natural molybdenum. This shows that the use of all these isotopes will increase the reactivity compared to the use of natural molybdenum. The data in Table 1 show that 92-Mo and 94-Mo have the lowest values for the thermal neutron absorption cross section (D) and the resonance integral of all molybdenum isotopes. The data in Table 1 show that 96-Mo and 97-Mo have values for the thermal neutron absorption cross section (D) and the resonance integral which are only somewhat lower than those for natural molybdenum. The data in Table 1 show that 98-Mo and 100-Mo have values for the thermal neutron absorption cross section (D) and the resonance integral which are intermediate between those of 92-Mo and 94-Mo on the one hand and 96-Mo and 97-Mo on the other hand. The isotopic composition that will be applied in practical applications will depend on various parameters, such as the costs of enrichment of the molybdenum in 92-Mo and 94-Mo compared to the costs of enrichment of the molybdenum in 98-Mo and 100-Mo.

The impact of the use of molybdenum depleted in 95-Mo in U—Mo fuel in a test reactor can lead to an annual savings of 2.5 to 3 fuel elements. This means that fewer fuel elements must be purchased at high cost and fewer spent fuel elements must be disposed of at even higher cost.

The production of molybdenum which does not contain any 95-Mo is not feasible from a technical point of view. Therefore, the 95-Mo-depleted molybdenum will still contain some 95-Mo. The 95-Mo concentration that will be used for practical application will depend on various parameters, such as: the costs of the enrichment of uranium in 235-U and the costs of depletion of molybdenum in 95-Mo; the costs for the production of fuel plates and fuel elements; and/or the costs of disposing of spent fuel elements.

According to a further embodiment of the present invention, the depleted molybdenum contains less than 15% by weight, more particularly approximately 5% by weight, of the molybdenum isotope 95-Mo. With these percentages by weight of the molybdenum isotope 95-Mo, relatively high reactivity values are obtained.

According to an even further embodiment of the present invention, the content of molybdenum in the uranium-molybdenum alloy is in the range of 2–20% by weight, more particularly in the range of 5–10% by weight. When the fuel contains such an amount of molybdenum, a relatively high concentration of uranium can be incorporated therein without the uranium becoming mechanically unstable during irradiation. In particular, at a content of 5–10% by weight, sufficient uranium can be present in the fuel to obtain a neutron yield useful for the purposes mentioned earlier. In a preferred embodiment, the fuel contains more than 3 grams/cm$^3$, more particularly more than 4 grams/cm$^3$, of uranium. More preferably, the fuel contains more than 5 grams/cm$^3$, more particularly more than 7.5 grams/cm$^3$, of uranium. Such densities of enriched uranium provide relatively high neutron yields and high reactivity values. A fuel that comprises uranium in such relatively high densities can comprise an aluminum matrix embedding the alloy of uranium and molybdenum, so that a stable fuel meat is formed.

The present invention further provides a fuel element. Such a nuclear fuel element can be made by a method according to the invention. Such a fuel element is relatively simple to recycle, compared with, for instance, fuel elements containing uranium-silicon compounds. Since the fuel element is not provided with highly enriched uranium, production, transport and use of such a fuel element is preferable, from a non-proliferation point of view, to fuel elements that do contain highly enriched uranium.

The advantages discussed above of using molybdenum depleted in the isotope 95-Mo result for any level of uranium enrichment, although in different degree. Therefore, the present invention is applicable to all levels of uranium enrichment. The enriched uranium can for example contain 2–40% by weight, in particular 10–20% by weight, of the isotope 235-U. On the other hand, a fuel comprising an alloy of a higher enriched uranium, such as HEU, and Mo-95 depleted molybdenum is also within the scope of the present invention. Enrichment of this uranium can be implemented in different ways, for example by utilizing ultracentrifuges, by gas diffusion, or by a combination of these or other methods. Besides, the enriched uranium can be obtained from the mixing of highly enriched uranium with lowly enriched or natural uranium. This is also known as HEU downblending.

Further, the depleted molybdenum can have been obtained in different ways, for example by utilizing ultracentrifuges.

The molybdenum can also be enriched in the isotope 92-Mo, 94-Mo, 96-Mo, 97 Mo, 98-Mo and/or 100-Mo, resulting in molybdenum which is effectively depleted in 95-Mo.

To those skilled in the art, it will be clear that various modifications are possible within the scope of the present invention.

What is claimed is:

1. A method of providing a nuclear fuel, comprising:
   processing molybdenum to deplete the isotope 95-Mo; and
   forming an alloy of metallic uranium and the processed molybdenum, wherein the uranium is enriched in the isotope 235-U.

2. A method according to claim 1, wherein the fuel contains more than 3 grams/cm$^3$ of uranium.

3. A method according to claim 1, wherein the fuel contains more than 4 grams/cm$^3$ of uranium.

4. A method according to claim 1, wherein the fuel contains more than 5 grams/cm$^3$ of uranium.

5. A method according to claim 1, wherein the fuel contains more than 7.5 grams/cm$^3$ of uranium.

6. A method according to claim 1, wherein the depleted molybdenum contains less than 15% by weight of the molybdenum isotope 95-Mo.

7. A method according to claim 1, wherein the depleted molybdenum contains less than approximately 5% by weight of the molybdenum isotope 95-Mo.

8. A method according to claim 1, wherein processing molybdenum comprises enriching molybdenum in the isotope 92-Mo, 94-Mo, 96-Mo, 97-Mo, 98-Mo, 100-Mo, or any combination thereof.

9. A method of providing a nuclear fuel, comprising:
   forming an alloy of metallic uranium and molybdenum having uranium enriched in the isotope 235-U and molybdenum depleted in the isotope 95-Mo, and the content of molybdenum in the uranium-molybdenum alloy is in the range of 2–20% by weight.

10. A method according to claim 1, wherein the content of molybdenum in the uranium-molybdenum alloy is in the range of 5–10% by weight.

11. A method according to claim 1, wherein processing molybdenum comprises using ultracentrifuges.

12. A method according to claim 1, wherein the uranium-molybdenum alloy is dispersed in aluminum.

13. A method according to claim 1, wherein the enriched uranium is obtained by mixing highly enriched uranium with lowly enriched or natural uranium.

14. A method according to claim 1, wherein the enriched uranium contains 2–40% by weight of the isotope 235-U.

15. A method according to claim 1, wherein the enriched uranium contains 10–20% by weight of the isotope 235-U.

16. A fuel element including a nuclear fuel made by the method according to claim 1.

17. A method according to claim 1, wherein processing molybdenum to deplete the isotope 95-Mo comprises processing natural molybdenum.

18. A method according to claim 1, wherein processing molybdenum to deplete the isotope 95-Mo comprises processing molybdenum in a non-fission reaction.

19. A method according to claim 9, further comprising processing molybdenum to deplete the isotope 95-Mo.

20. A method according to claim 19, wherein processing molybdenum comprises processing natural molybdenum using ultracentrifuges.

21. A method according to claim 19, wherein processing molybdenum comprises enriching natural molybdenum in the isotope 92-Mo, 94-Mo, 96-Mo, 97-Mo, 98-Mo, 100-Mo, or any combination thereof.

* * * * *